(12) United States Patent
Milnes et al.

(10) Patent No.: US 11,916,260 B2
(45) Date of Patent: Feb. 27, 2024

(54) INJECTION OF WATER IN ELECTROCHEMICAL SYSTEMS

(71) Applicant: L3 Open Water Power, Inc., Somerville, MA (US)

(72) Inventors: Thomas B. Milnes, Beverly, MA (US); Ian McKay, Seattle, WA (US); Thomas Humplik, Albuquerque, NM (US)

(73) Assignee: L3Harris Open Water Power, Inc., Somerville, MA (US)

( * ) Notice: Subject to any disclaimer, the term of this patent is extended or adjusted under 35 U.S.C. 154(b) by 784 days.

(21) Appl. No.: 15/508,927

(22) PCT Filed: Sep. 2, 2015

(86) PCT No.: PCT/US2015/048046
§ 371 (c)(1),
(2) Date: Mar. 5, 2017

(87) PCT Pub. No.: WO2016/036795
PCT Pub. Date: Mar. 10, 2016

(65) Prior Publication Data
US 2017/0279127 A1    Sep. 28, 2017

Related U.S. Application Data

(60) Provisional application No. 62/046,481, filed on Sep. 5, 2014.

(51) Int. Cl.
*H01M 10/44* (2006.01)
*H01M 6/34* (2006.01)
(Continued)

(52) U.S. Cl.
CPC ......... *H01M 6/34* (2013.01); *H01M 8/04149* (2013.01); *H01M 8/04186* (2013.01); *H01M 8/227* (2013.01)

(58) Field of Classification Search
CPC ............... H01M 6/34; H01M 8/04149; H01M 8/04186; H01M 8/228; H01M 8/227
See application file for complete search history.

(56) References Cited

U.S. PATENT DOCUMENTS 3,573,103 A * 3/1971 Brown .................... H01M 6/22
429/458
3,708,344 A * 1/1973 Bernstein ................ H01M 4/60
429/201

(Continued)

FOREIGN PATENT DOCUMENTS

CA    2423109 A1    8/2001

OTHER PUBLICATIONS

International search report for PCT/US2015/048046, dated Dec. 28, 2015, 3 pages.

(Continued)

*Primary Examiner* — Thanh Truc Trinh
(74) *Attorney, Agent, or Firm* — Danielson Legal LLC

(57) ABSTRACT

Systems, methods, and apparatus configured for the osmotic injection of water in electrochemical systems are generally described. In certain embodiments, water can be transported from a water-containing liquid in an environment outside the electrochemical cell into the electrochemical cell across an osmotic medium fluidically separating an interior compartment of the electrochemical cell from the environment outside the electrochemical cell. The systems, methods, and apparatus described herein can be, according to certain embodiments, configured to be part of an electrochemical system in which water is consumed (e.g., as a reactant).

20 Claims, 6 Drawing Sheets

(51) Int. Cl.
*H01M 8/04186* (2016.01)
*H01M 8/22* (2006.01)
*H01M 8/04119* (2016.01)

(56) References Cited

U.S. PATENT DOCUMENTS

| | | | | |
|---|---|---|---|---|
| 4,493,878 | A * | 1/1985 | Horiba | H01M 8/00 |
| | | | | 429/101 |
| 2003/0031913 | A1 | 2/2003 | Pavio et al. | |
| 2004/0265660 | A1 * | 12/2004 | Reuschel | H01M 10/613 |
| | | | | 429/437 |
| 2012/0115052 | A1 * | 5/2012 | Kokubu | H01M 8/04029 |
| | | | | 429/410 |
| 2012/0301798 | A1 | 11/2012 | Matsumoto et al. | |
| 2013/0017414 | A1 * | 1/2013 | He | C02F 3/005 |
| | | | | 429/2 |
| 2013/0146521 | A1 * | 6/2013 | Brozell | B01D 69/122 |
| | | | | 210/259 |
| 2013/0306565 | A1 | 11/2013 | Davis | |
| 2013/0316196 | A1 * | 11/2013 | McCluskey | H01M 8/065 |
| | | | | 429/9 |

OTHER PUBLICATIONS

Written opinion for PCT/US2015/048046, dated Dec. 28, 2015, 6 pages.
Office action from CA2961351, dated Mar. 24, 2022, 3 pgs.
Examination search report from CA2961351, dated Sep. 14, 2021, 3 pgs.

* cited by examiner

INJECTION OF WATER IN ELECTROCHEMICAL SYSTEMS

RELATED APPLICATIONS

This application is the national phase of International (PCT) Patent Application No. PCT/US2015/048046, filed internationally on Sep. 2, 2015, and claims priority under 35 U.S.C. 119(e) to U.S. Provisional Patent Application Ser. No. 62/046,481, filed Sep. 5, 2014, both entitled "Injection of Water in Electrochemical Systems," each of which is incorporated herein by reference in its entirety for all purposes.

GOVERNMENT SPONSORSHIP

Certain aspects described herein were made with support from the United States Government via the U.S. Navy's Combating Terrorism Technical Support Office and Rapid Reaction Technology Office, under award number N00421-10-D-0001-0017. The government may have rights in certain of the inventions described herein.

TECHNICAL FIELD

Systems, methods, and apparatus configured for the osmotic injection of water in electrochemical systems are generally described.

BACKGROUND

In many electrochemical cell systems (including many metal-fuel type batteries and fuel cells), water is consumed during the electrochemical process (e.g., as a reactant). Thus, in such systems, water must be fed to the system in order to ensure proper performance. However, including a water reactant reservoir (or other water source) in the electrochemical system can reduce the energy density and specific energy of the system, as it reduces the volume and mass available for carrying fuel metals and/or other reactants.

Accordingly, improved electrochemical systems which do not require an integrated water source would be desirable.

SUMMARY

The osmotic injection of water into electrochemical systems is generally described. The subject matter of the present invention involves, in some cases, interrelated products, alternative solutions to a particular problem, and/or a plurality of different uses of one or more systems and/or articles.

In one aspect, an apparatus for transporting water into an electrochemical cell is provided. In certain embodiments, the apparatus comprises a housing defining a housing interior and comprising an inlet and an outlet; an osmotic medium associated with the inlet and defining an interface between the housing interior and an environment external to the housing; and a pressure-activated valve associated with the outlet and defining an interface between the housing interior and an interior of an electrochemical cell.

In some embodiments, the apparatus comprises an osmotic medium fluidically separating an interior compartment of an electrochemical cell from an environment external to the electrochemical cell, wherein the electrochemical cell is configured to consume water as a reactant during operation.

In one aspect, a method of operating an electrochemical cell is provided. In some embodiments, the method comprises operating the electrochemical cell to generate an electrical current while water is transported from a water-containing liquid in an environment outside the electrochemical cell into the electrochemical cell across an osmotic medium fluidically separating an interior compartment of the electrochemical cell from the environment outside the electrochemical cell.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Systems, methods, and apparatus configured for the osmotic injection of water in electrochemical systems are generally described. The systems, methods, and apparatus described herein can be, according to certain embodiments, configured to be part of an electrochemical system in which water is consumed (e.g., as a reactant). As noted above, integrating a water source into such systems can reduce energy density and specific energy. According to certain embodiments, rather than integrating a water source, an osmotic medium can be used to draw in water from an external water source (e.g., an environment outside the electrochemical system). The water drawn from the external source can be subsequently transported into the compartment of the electrochemical cell which can, according to certain embodiments, consume the water during electrochemical operation. In some such systems, higher energy densities can be achieved by drawing water from the surroundings to serve as the reactant, much as a car draws oxygen from the atmosphere to burn gasoline.

According to some embodiments, the total amount of water that is transported into the housing of the system is regulated. In many applications, it is important to inject a specific amount of water into the electrochemical cell during operation. In some such cases, too much water will cause the electrochemical cell to burst, while too little water will leave the fuel metals within the electrochemical cell partially unreacted (thus reducing energy density and specific energy). Many mechanical systems exist for precise water metering including, for example, syringe pumps and peristaltic pumps. However, these systems have a level of mechanical complexity that is generally not well suited for many small battery/electrochemical cell systems. In addition, the parts of such mechanical systems occupy additional volume, thereby reducing the energy density and specific energy of the overall system. According to certain inventive embodiments, a pressure-activated valve can be coupled with the osmotic medium to accurately meter a fixed amount of water into the electrochemical cell. The use of the osmotic medium and the pressure-activated valve can be advantageous, according to certain embodiments, as this systems has few moving parts, occupies a small volume, rejects unwanted external solutes and contaminants, and may be used to precisely meter the volume of fuel water that is injected into the electrochemical cell.

Figure 1A:
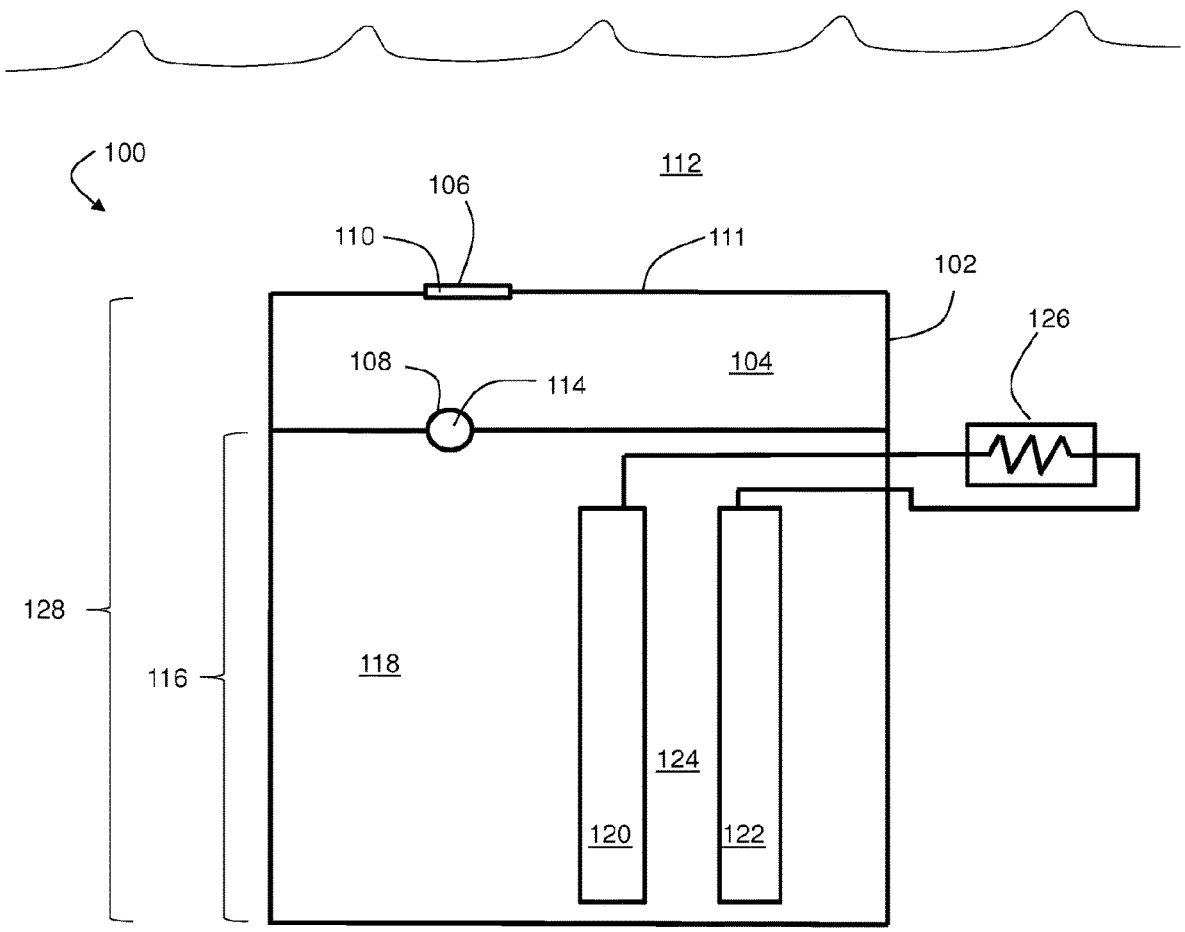
FIGS. 1A-1C are schematic cross-sectional illustrations of exemplary apparatus in which water is transported into an electrochemical cell.

FIG. 1A is a cross-sectional schematic illustration of apparatus 100 in which water is transported into an electrochemical cell. In FIG. 1A, apparatus 100 comprises housing 102. Housing 102 defines housing interior 104. In addition, housing 102 comprises inlet 106 and outlet 108. The walls of housing 102 can be rigid or flexible. For example, in certain embodiments, the walls of housing 102 can have a material durometer value of from 0 to about 100. In addition, the walls of housing 102 can be made of any suitable material, including, but not limited to, metals (e.g., titanium, steel, aluminum, copper, nickel, and/or alloys thereof), polymers (e.g., acrylic, polyethylene, polypropylene, nylon, silicone, fluoropolymer (e.g., polytetrafluoroethylene (available commercially as Teflon®), butadiene, styrene, and/or mixtures of these or other polymers), and/or mixtures of polymers and metals (e.g., acrylic-coated titanium).

In certain embodiments, apparatus 100 also comprises electrochemical cell 116. Generally, electrochemical cell 116 comprises anode 120, cathode 122, and electrolyte 124. During operation, an electrochemical reaction can occur in the electrochemical cell such that ions are transported between anode 120 and cathode 122 (via electrolyte 124), and electrons are transported between anode 120 and cathode 122. In certain embodiments, an electrical load external to the apparatus can be driven using electrical current generated by the electrochemical cell. For example, referring to FIG. 1A, electrical load 126 can be connected to electrochemical cell 116 such that the electrical current generated by the electrochemical cell powers the electrical load.

The electrochemical cell can comprise an electrochemical cell interior that is fluidically connected to the housing interior. For example, in FIG. 1A, electrochemical cell 116 comprises an electrochemical cell interior 118 fluidically connected to housing interior 104. In some embodiments, the electrochemical cell interior and the housing interior are directly fluidically connected. Generally, a direct fluidic connection exists between a first unit and a second unit (and the two units are said to be "directly fluidically connected" to each other) when they are fluidically connected to each other and the composition of the fluid does not substantially change (i.e., no fluid component changes in relative abundance by more than 5% and no phase change occurs) as it is transported from the first unit to the second unit. As an illustrative example, a stream that connects first and second units, and in which the pressure and temperature of the fluid is adjusted but the composition of the fluid is not altered, would be said to directly fluidically connect the first and second units. If, on the other hand, a separation step is performed and/or a chemical reaction is performed that substantially alters the composition of the stream contents during passage from the first unit to the second unit, the stream would not be said to directly fluidically connect the first and second units.

The electrochemical apparatus may be at least partially submerged in a water-containing liquid environment, according to certain embodiments. For example, referring to FIG. 1A, apparatus 100 is submerged in water-containing environment 112. In certain embodiments, at least a portion of the water within water-containing environment 112 can be transported into the electrochemical system (e.g., into housing 102 and, in some instances, into electrochemical cell interior 118). In some such embodiments, the electrochemical system can consume water as a reactant. For example, the water that is injected into the electrochemical cell may be consumed as the electrochemical reaction within the electrochemical cell proceeds. In this way, the water-containing liquid environment in which the electrochemical apparatus is at least partially submerged can serve as a fuel source for the electrochemical cell in the apparatus.

Apparatus 100 can comprise osmotic medium 110. Generally, the osmotic medium is configured such that solvent can be selectively transported through the osmotic medium. For example, the osmotic medium can be configured such that, during operation, solute is retained on one side of the osmotic medium while solvent (e.g., pure solvent, such as pure water) is allowed to pass to the opposite side of the osmotic medium. As one non-limiting example, the osmotic medium can be an osmotic membrane, although it should be understood that any medium capable of selectively transporting a solvent (e.g., water) through the medium while restricting the transport of solute through the medium can be used as the osmotic medium. The osmotic medium can be associated with an inlet of the housing, and can define an interface between a volume within the housing and an environment outside the housing. For example, referring to FIG. 1A, osmotic medium 110 is associated with inlet 106 of housing 102, and defines an interface between housing interior 104 and environment 112 external to housing 102.

Osmotic medium 110 can be associated with inlet 106 in any suitable fashion. According to certain embodiments, the osmotic medium forms at least a portion of a wall of the housing. Referring to FIG. 1A, osmotic medium 110 forms a portion of wall 111 of housing 102. In other embodiments, the osmotic medium can form an entire wall of housing 102. The osmotic medium in the housing can be integrated with each other in a number of ways. For example, in certain embodiments, the osmotic medium can overlay the inlet of the housing, for example, by arranging the osmotic medium so that it spans the external and/or the internal surface of the housing adjacent the housing inlet. In certain embodiments, the osmotic medium can be adhered, welded, held in place by a flange (e.g., a gasketed flange), or otherwise attached to the edges of the inlet. In certain embodiments, the wall the housing can be a multilayered structure, and the osmotic medium can correspond to a portion of an inner layer of the multilayer structure. In certain embodiments, the osmotic medium can form a seal across the housing inlet such that water can be transported through the inlet of the housing only through the osmotic medium. This arrangement can, according to certain embodiments, prevent unwanted solute from entering the housing from environment external to the housing. Those of ordinary skill in the art, given the present specification, would be capable of integrating the osmotic medium with the housing structure using a number of other methods.

Apparatus 100 also comprises pressure-activated valve 114 associated with outlet 108. Generally, the pressure-activated valve is a one-way valve that allows flow from a first side of the valve to a second side of the valve only when the difference in fluid pressure from the first side to the second side is above a threshold value, and that does not allow flow from the second side of the valve to the first side of the valve. For example, referring to FIG. 1A, pressure-activated valve 114 can be configured such that water is not permitted to be transported across the valve 114 from interior 118 of electrochemical cell 116 to housing interior 104. Pressure-activated valve 114 can also be configured such that water is not transported from housing interior 104 to electrochemical cell interior 118 until a minimum threshold pressure drop across the valve 114 (from housing interior 104 to electrochemical cell interior 118) is reached. In other words, pressure-activated valve 114 can be configured such that, when the pressure within housing interior 104 is greater than the pressure within electrochemical cell interior 118, but the difference between the two pressures is below a threshold level, no water is transported from housing interior 104 to electrochemical cell interior 118; and, when the pressure within housing interior 104 is greater than the pressure within electrochemical cell interior 118, and the difference between the two pressures is above a threshold level, water is transported from housing interior 104 to electrochemical cell interior 118.

In certain embodiments, pressure-activated valve 114 defines an interface between housing interior 104 and an interior 118 of electrochemical cell 116. In certain embodiments, pressure-activated valve 114 is arranged such that it spans the edges of outlet 108 of housing 102, or such that it spans the edges of a conduit fluidically connected to outlet 108 of housing 102. The housing and/or pressure-activated valve may be configured, in some embodiments, to avoid exposure of the solute to the electrolyte within the electrochemical cell, prior to injection of the solute into the electrochemical cell. For example, in some such embodiments, the pressure-activated valve forms a fluidic seal across the housing outlet such that water can be transported from housing interior 104 to electrochemical cell interior 118 only through the pressure-activated valve. This arrangement can, according to certain embodiments, prevent solution within housing interior 104 from being transported into interior 118 of electrochemical cell 116 unless certain pressure differentials between housing interior 104 and electrochemical cell interior 118 are present. The pressure-activated valve 114 can be adhered, welded, or threaded into the wall separating interior 104 from electrochemical cell interior 118, or could be integrated by similar means into any other fluidic connection between interior 104 and electrochemical cell interior 118.

In certain embodiments, the housing comprises an aqueous solution contained within the housing interior. The aqueous solution can be, according to certain embodiments, configured to create an osmotic pressure sufficiently large to osmotically transport water from the environment external to the housing to the housing interior. For example, referring to FIG. 1A, housing interior 104 can contain an aqueous solution with a solute concentration that is higher than the concentration of solutes in the liquid located in environment 112 external to the housing 102. Due to the difference in solute concentrations, water may be transported, via osmosis, across osmotic medium 110 to equalize the solute concentrations on each side of the osmotic medium. In certain embodiments, the transport of water from external environment 112, across osmotic medium 110, and into housing interior 104 can lead to an increase in pressure within housing interior 104. As described in more detail below, the pressure within housing interior 104 can be increased, in some embodiments, until a threshold pressure is reached, at which point solution within housing interior 104 is transported across pressure-activated valve 114 and into electrochemical cell interior 118.

The housing can contain any suitable aqueous solution. In some embodiments, the aqueous solution is a single-solute solution. In some embodiments, the aqueous solution comprises a plurality of solutes. Any suitable solute can be used in the aqueous solutions described herein. For example, in embodiments in which the aqueous solution comprises a single-solute solution, the solute within the single-solute solution can be sodium chloride (NaCl), potassium chloride (KCl), sodium hydroxide (NaOH), potassium hydroxide (KOH), sodium permanganate ($NaMnO_4$), potassium permanganate ($KMnO_4$), sucrose, or other salts, including but not limited to those containing $OH^-$, $Cl^-$, $Na^+$, $Mg^{2+}$, $SO_4^{2-}$, $Ca^{2+}$, $K^+$, $Br^-$, $Sr^{2+}$, or $F^-$ ions. In embodiments in which the aqueous solution comprises at least two solutes, the solutes can correspond to any two or more of the above-listed solutes. In certain embodiments, the salt chosen to occupy interior 104 may be present in a concentration above its solubility in aqueous media, such that it is present initially in both its dissolved and solid phases.

In certain embodiments, a solute within the housing interior corresponds to an electrolyte compound capable of transporting ions in the electrochemical cell. For example, in certain embodiments, housing interior 104 contains a solute that acts as an electrolyte once it has been transported to electrochemical cell interior 118 (e.g., via housing outlet 108). That is to say, the solute, once transported to electric chemical cell 116, may act to transport ions between anode 120 and cathode 122 within a electrochemical cell 116. As one non-limiting example, in certain embodiments, the electrochemical cell (e.g., cell 116 in FIG. 1A) comprises an aluminum anode and a platinum cathode. In some such embodiments, the housing interior may contain potassium hydroxide (KOH), which can serve as a conductive medium for the aluminum-water reaction that takes place in the electrochemical cell.

In some embodiments, a solute within the housing interior corresponds to a reactant compound capable of being electrochemically consumed in the electrochemical cell. For example, in certain embodiments, housing interior 104 contains a solute that reacts at the anode or cathode once it has been transported to electrochemical cell interior 118 (e.g., via housing outlet 108). For example, in some embodiments, the electrochemical cell comprises an aluminum anode and a platinum cathode. In some such embodiments, the housing interior may contain water as a solute. The water can serve as an oxidizer for the aluminum-water reaction in the electrochemical cell.

According to certain embodiments, a solute within the housing interior corresponds to a catalyst capable of catalyzing or otherwise driving the electrochemical reaction within the electrochemical cell. For example, in certain embodiments, housing interior 104 contains a solute that catalyzes an electrochemical reaction once it has been transported to electrochemical cell interior 118 (e.g., via housing outlet 108). For example, in certain embodiments in which the electrochemical cell comprises an aluminum anode and a platinum cathode, the housing interior may contain dissolved $Ga_2O_3$. The $Ga_2O_3$ can, in certain such embodiments, facilitate the efficient oxidation of aluminum in the electrochemical cell.

In certain embodiments, the housing interior contains, at at least one point during operation of the electrochemical system, an amount of solute that is greater than an amount of the solute that can be dissolved when the housing is filled with water at a temperature of 25° C. Such arrangements can be advantageous, according to certain embodiments, when it is desired to make the system as volumetrically compact as possible, for a given amount of total water injection to the electrochemical cell. According to certain embodiments, after the housing has been loaded with more solute than can initially be dissolved, the internal concentration of the solution within the housing stays at or near the saturation point. This is because new water that is transported into the housing dissolves a portion of the undissolved solute, rather than diluting the existing solution within the housing. In this way, the undissolved solute acts as a buffer to maintain a relatively constant concentration of solution within the housing.

In some embodiments, the housing contains water and a co-solvent. The co-solvent can, according to certain embodiments, serve to decrease the water activity in the mixture injected into the electrochemical cell, which may be desirable for some cell chemistries. Any suitable co-solvent can be used. For example, in some embodiments, the housing contains water and at least one polar aprotic solvent (e.g., acetonitrile, tetrahydrofuran, dimethyl carbonate). In some embodiments, the housing contains water and at least one polar protic solvent (e.g., a primary alcohol such as methanol, ethanol, and the like). In certain embodiments, the housing contains water and at least one nonpolar solvent or oil (e.g., toluene and/or carbon tetrachloride).

The housing and the electrochemical cell can be incorporated with each other in a variety of arrangements. In some embodiments, the housing is incorporated in whole or in part into a containment structure of the electrochemical cell. For example, referring to FIG. 1A, housing 102 and electrochemical cell 116 share a common containment structure 128. In such a configuration, housing 102 and electrochemical cell 116 can be detachably coupled, or they may be integrally attached. Two components are said to be integrally attached when the two components cannot be separated without damaging or permanently deforming the structure of at least one of the two components.

Figure 1B:
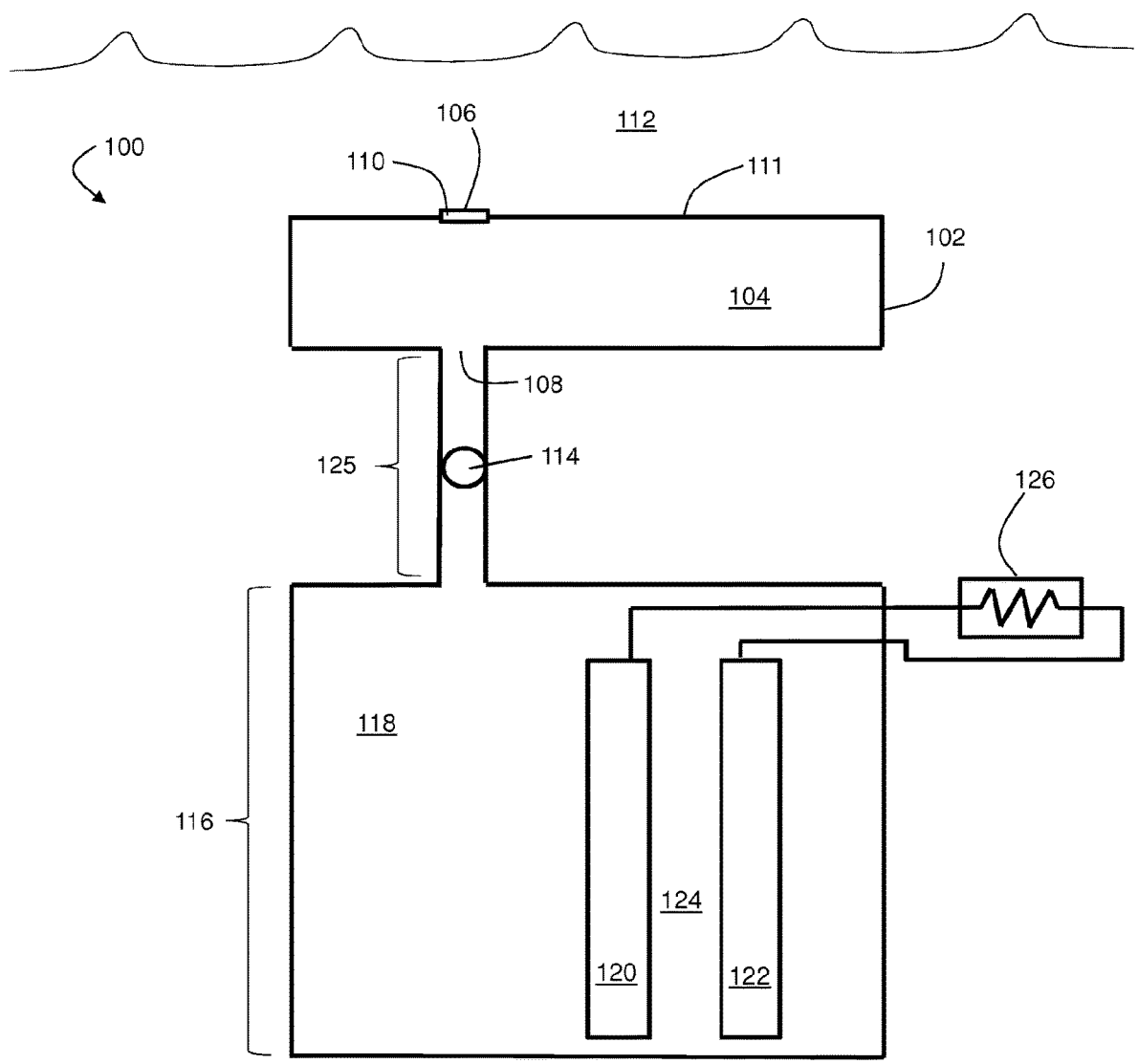

In other embodiments, the housing and the electrochemical cell can be separate components that are joined by a fluidic connection (e.g., a tube, pipe, or other conduit). For example, in FIG. 1B, housing 102 and electrochemical cell 116 are connected via conduit 125.

In some embodiments, the housing and the electrochemical cell can both be connected to a fluidic loop. For example, in FIG. 1C, housing 102 and electrochemical cell 116 are both fluidically connected to fluidic loop 127. In some embodiments, fluidic loop 127 can be configured such that fluid can be circulated through the loop. In some embodiments, the fluidic loop may be fluidically connected to other fluidic subsystems, in addition to the housing and the electrochemical cell. For example, in FIG. 1C, fluidic loop 127 is fluidically connected to subsystem 130. The subsystem can be, for example, a circulation pump, a waste filter, and/or a waste outlet.

The apparatus can be operated, for example, by at least partially submerging the apparatus into a water-containing liquid. For example, as noted above, in FIG. 1A, apparatus 100 is submerged in the water-containing liquid of environment 112 external to housing 102. The water-containing liquid can be, in some embodiments, a saline aqueous solution. For example, the water-containing liquid can be seawater. In certain embodiments, after the apparatus is submerged into the water-containing liquid, at least a portion of the water within the water-containing liquid is transported across the osmotic medium into the housing interior. For example, referring to FIG. 1A, when apparatus 100 is submerged in the water-containing liquid of environment 112 external to housing 102, water within environment 112 can be transported across osmotic medium 110 into housing interior 104. The transportation of water across the osmotic medium can be osmotically driven. For example, as noted above, the housing interior can contain a solute. In some embodiments, the level of solute within the housing can be sufficiently high such that the osmotic pressure within the housing is higher than the osmotic pressure in the external environment (e.g., within the seawater). As a result, water from the external environment can flow across the osmotic medium (e.g., via osmosis) and into the housing.

According to certain embodiments, the transport of water into the housing interior raises the pressure of the liquid within the housing interior. For example, the osmotic influx of water into the housing can generate a gauge pressure within the housing. In certain embodiments, the pressure of the liquid within the housing interior is raised beyond a threshold pressure (e.g., the pressure at which the pressure-activated valve allows flow of water across it). In some such embodiments, after the threshold pressure is reached, water is transported from the housing interior, across the pressure-activated valve, and into an interior of the electrochemical cell. For example, referring to FIG. 1A, once a threshold pressure difference between housing interior 104 and electrochemical cell interior 118 is reached, solution from the housing interior 104 can be transported through outlet 108 and pressure-activated valve 114, and into interior 118 of electrochemical cell 116. In some embodiments, the gauge pressure within the housing interior is raised until the gauge pressure reaches the cracking pressure of the pressure-activated valve. After the cracking pressure of the pressure-activated valve is reached, a finite amount of the solution contained within the housing can be injected through the pressure-activated valve into the interior of the electrochemical cell.

The water transported across the osmotic medium can dilute the solution contained within the housing. In addition, the solution within the housing that is transported through the pressure-activated valve can transport some of the solute contained within the housing out of the housing. In this way, the concentration of solution inside the housing can be gradually decreased. In some embodiments, the concentration of solution inside the housing is decreased until the solution within the housing reaches isotonicity with the exterior water supply (e.g., the water supply within environment 112 in FIG. 1A). At this point, water flux across the osmotic medium stops, and no additional water is injected into the electrochemical cell.

In certain embodiments, certain of the systems and apparatus described herein can be used to perform precision metering of water from an external source into the electrochemical cell. In some embodiments, the osmotic medium and the pressure-activated valve can act as a water injection management system, which can be used to transport a predetermined amount of water needed by the electrochemical cell into the electrochemical cell. The ability to transport a predetermined amount of water into the electrochemical cell can be important. In certain circumstances, if too much water is injected into the electrochemical cell, the electrochemical cell may burst. In some instances, if too little water is injected into the electrochemical cell, fuel metals and/or other reactants may not be consumed during operation of the electrochemical cell, and a corresponding drop in effective energy density and/or specific energy will be observed.

In some embodiments, solute within the housing is gradually diluted as water is transported into the housing via the osmotic medium and water (containing solute) is transported out of the housing, through the pressure-activated valve, and into the electrochemical cell. In certain embodiments, the dilution process will continue until the solution within the housing is isotonic with the exterior water-containing environment, at which point, water flux into the housing (via the osmotic medium) and injection into the electrochemical cell will stop. In certain embodiments, the total amount of water injected into the electrochemical cell can be predetermined by loading the housing with a predetermined amount of solute. The predetermined amount of solute that is loaded into the housing can be based on the known concentration of solute within the water-containing environment in which the apparatus is to be used. For example, if the apparatus is to be submerged in seawater, the amount of the solvent loaded into the housing can be determined based on the concentration of solute(s) within the seawater.

The amount of water that is injected into the housing can be calculated as follows. For a housing having a volume $V_c$ with initial internal solute concentration $C_c$, external solute concentration $C_e$, and expansion volume $\Delta V$ at the pressure cutoff of the pressure-actuated valve, the number of discrete valve openings n can be calculated numerically by satisfying the inequality:

$$(C_c - C_e)\left(\frac{V_c}{V_c + \Delta V}\right)^n > 0$$

The total volume, $V^w$ of water injected can then be calculated as:

$$V_w = n\Delta V$$

In one embodiment, the system can repeatedly inject discrete amounts of water into the electrochemical cell. An exemplary cycle could proceed as follows:
1) Water is transported into the housing across the osmotic medium.
2) The housing accommodates the influx of water (optionally expanding to some degree, in certain cases) and a corresponding pressure builds up within the housing.
3) At some pressure (and, in some cases, an associated volume), the pressure-activated valve opens, expelling a discrete volume of water from the housing into the electrochemical cell, before the pressure-activated valve reseals.
4) The cycle is repeated until isotonicity between the solution within the housing and the solution within the environment external to the system is achieved.

In some embodiments, it may be desirable to have water transported from the housing into the electrochemical cell in as close to a continuous manner as possible. This may be approximated, for example, by configuring the system such that small volumes of water are transported from the housing interior to the electrochemical cell. The size of the discrete water injections from the housing into the cell may be tailored, for example, by altering both the cracking pressure of the pressure-activated valve, and the overall rigidity of the housing. In some embodiments, multiple small housings contribute water to a single electrochemical cell to achieve more continuous small flows from multiple sources. In certain embodiments, the system can be configured such that, between each opening and closing of the pressure-activated valve, less than 0.1 mL of solution is transported from the housing interior into the interior of the electrochemical cell.

In certain embodiments, a negative gauge pressure can be generated inside the electrochemical cell. In some such embodiments, the housing could be made to store water in a low-pressure and/or non-rigid container. In some embodiments, the negative gauge pressure within the electrochemical cell could be used to transport solution (via vacuum) from the housing into the electrochemical cell. This process can occur, for example, on an intermittent basis. In some embodiments, this arrangement can be used to purify water via forward osmosis. Such purification could be useful, for example, in certain cases in which the consumption of reactants in the electrochemical cell generates the negative gauge pressure used for fuel injection.

Figure 1C:
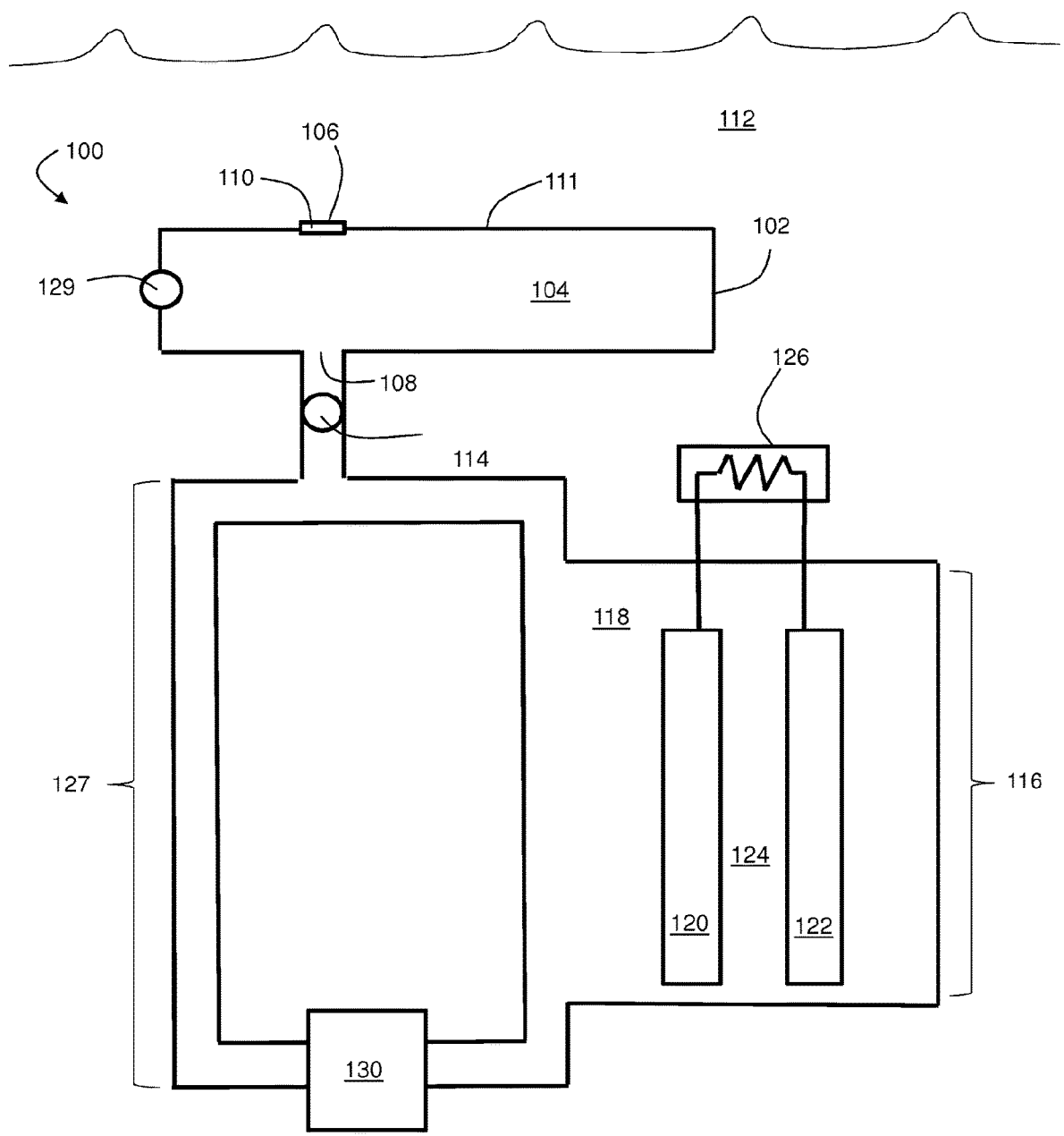

In certain embodiments, the pressure of the fluid within the housing can be adjusted (e.g., increased and/or decreased) to alter the rate of permeation of water across the osmotic medium. For example, in some embodiments, the cracking pressure on the pressure-activated valve could be adjusted to change the gauge pressure inside the housing. In some embodiments, an emergency relief valve can be incorporated into the housing. The emergency relief valve can be configured to adjust the pressure within the housing by exhausting the fluid within the housing to the external environment once the pressure of the fluid within the housing rises above a specific value. FIG. 1C includes a schematic illustration of such a valve. In FIG. 1C, emergency relief valve 129 is located on housing 102. Emergency relief valve 129 can be configured to adjust the pressure within housing 102 by exhausting the internal medium to environment 112 once the internal medium reaches a particular pressure.

According to certain embodiments, the electrochemical cell has a burst pressure, and the osmotic medium has a burst pressure that is lower than the burst pressure of the electrochemical cell. Generally, the burst pressure of a component is the pressure at which the component ruptures, thereby allowing fluid flow across the component. By configuring the osmotic medium (e.g., an osmotic membrane) such that it has a lower burst pressure than the electrochemical cell, one can ensure that the buildup of pressure within the housing of the system does not lead to mechanical failure of the electrochemical cell. In other words, in some such embodiments, the osmotic medium can act as a pressure relief valve for the system, ensuring that the electrochemical cell does not rupture. The osmotic medium could be designed to burst before the electrochemical cell bursts, either as a failsafe or as a design feature, in the event that the conditions within the housing (e.g., pressure) are such that too much solution is being transported into the electrochemical cell and/or the solution is being transported into the electrochemical cell at an excessive rate.

As noted above, certain of the systems described herein comprise an osmotic medium. Any suitable osmotic medium that allows for the transport of water across the medium and for the retention of solvent can be used. In some embodiments, the osmotic medium comprises an osmotic membrane. For example, the osmotic medium can comprise a forward osmosis membrane. The osmotic medium can comprise a solid material. In some embodiments, the osmotic medium comprises a solid porous material. In certain embodiments, the pores of the osmotic medium can be configured such that water or another solvent can be transported through the pores of the osmotic medium while solute ions are not transported through the pores of the osmotic medium. Non-limiting examples of materials from which the osmotic medium (e.g., osmotic membrane) can be made include, for example, polymers (e.g., organic polymers such as polytetrafluoroethylene (PTFE), polycarbonate, polypropylene, nylon, polyethylene, and/or polyester), and/or a metal. In some embodiments, the osmotic medium can be made of woven nylon, polyethylene, and/or polyester, optionally covered with a hydrophobic coating (e.g., a silane such as trichlorosilane and/or PTFE). In some embodiments, the osmotic medium can include pores with an average pore size of less than 100 micrometers (e.g., less than about 10 micrometers, such as from about 1 micrometer to about 100 micrometers or from about 1 micrometer to about 10 micrometers). For example, the osmotic medium can be made of a woven material (e.g., a polymeric material such as nylon, polyethylene, and/or polyester) with an average pore size of less than 100 micrometers (e.g., less than about 10 micrometers, such as from about 1 micrometer to about 100 micrometers or from about 1 micrometer to about 10 micrometers). Examples of commercially-available osmotic membranes suitable for use in association with certain embodiments include, but are not limited to, membrane disc filters as sold by Sterlitech Corporation (Kent, WA) and Hydration Technology Innovations (HTI) (Scottsdale, AZ).

As noted above, certain of the systems described herein comprise a pressure-activated valve, which can, for example, define an interface between the housing interior and an interior of an electrochemical cell. Examples of suitable pressure-activated valves that can be used include, but are not limited to, relief valves (e.g., rubber relief valves, diaphragm-type relief valves, and the like) and check valves (e.g., ball-and-spring check valves, diaphragm-type check valves, tilting disc check valves, lift check valves, flap valves, duckbill valves, and combinations of multiple valves thereof).

As noted above, certain of the systems described herein comprise an electrochemical cell. In some embodiments, the electrochemical cell is configured such that it consumes water during operation. For example, in some embodiments, the electrochemical cell is configured such that, during operation of the electrochemical cell, water is consumed as a reactant and/or is used to activate the electrolyte. Such systems include but are not limited to aluminum-water electrochemical cells, magnesium-water electrochemical cells, lithium-water electrochemical cells, sodium-water electrochemical cells, and water-activated electrochemical cells such as aluminum-permanganate electrochemical cells, magnesium-silver chloride electrochemical cells, magnesium-lead chloride electrochemical cells, magnesium hydrogen-peroxide electrochemical cells, magnesium-cuprous chloride electrochemical cells, magnesium-cuprous iodide electrochemical cells, magnesium-sulfur electrochemical cells, magnesium-ferrycyanate electrochemical cells, magnesium-cuprous thiocyanate electrochemical cells, aluminum-hydrogen peroxide electrochemical cells, aluminum-silver chloride electrochemical cells, aluminum-lead chloride electrochemical cells, aluminum-cuprous chloride electrochemical cells, aluminum-cuprous iodide electrochemical cells, aluminum-sulfur electrochemical cells, aluminum-ferrycyanate electrochemical cells, aluminum-cuprous thiocyanate electrochemical cells, lithium-sulfur, electrochemical cells and other water-activated electrochemical cells. In some embodiments, an electrode within the electrochemical system comprises an aluminum-based electrode active material.

The electrochemical apparatus described herein may be used in a wide variety of applications. For example, in some embodiments, the electrochemical system is part of an underwater vehicle. In certain embodiments, the electrochemical system is part of an underwater sensor system.

The following examples are intended to illustrate certain embodiments of the present invention, but do not exemplify the full scope of the invention.

PROPHETIC EXAMPLE 1

Figure 2:
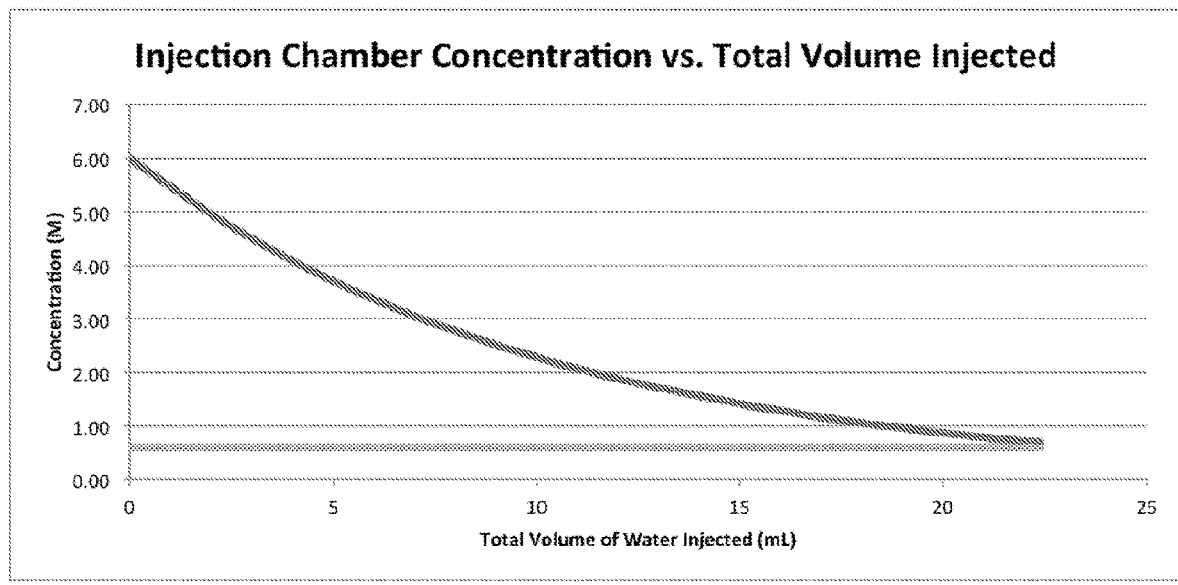
FIG. 2 is a plot of solute concentration as a function of the total volume water injected into an electrochemical cell, according to certain embodiments.
Figure 3:
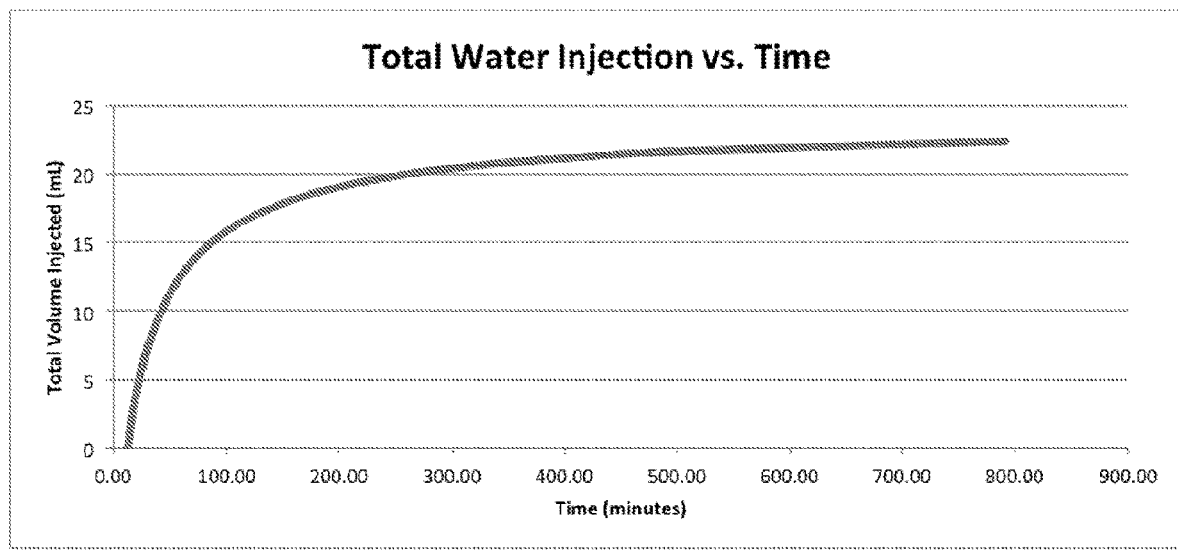
FIG. 3 is a plot of the total volume of water injected as a function of time, according to some embodiments.

This prophetic example illustrates the use of an osmotic medium and a pressure-activated valve to inject a predetermined amount of solution into an electrochemical cell. The housing may be assumed to have a volume of 10 mL, and can expand and then inject 0.7 mL volumes of solution at a time into the electrochemical cell. The concentration of NaCl within the housing can start at 6 M (approximately the saturation point), and the exterior water supply is assumed to have a concentration of NaCl of 0.6 M (which is the approximate salinity of seawater). If one assumes that the concentration of NaCl within the housing is substantially uniform at any given point in time, and a nominal permeation rate through the osmotic medium is 0.01 mL/M/minute, the behavior illustrated in FIGS. 2 and 3 is observed. Specifically, as shown in FIG. 2, as water will be transported into the housing, the concentration of solute within the housing will decay exponentially. As shown in FIG. 3, the rate at which water is injected into the housing will decrease with time.

EXAMPLE 2

Figure 4:
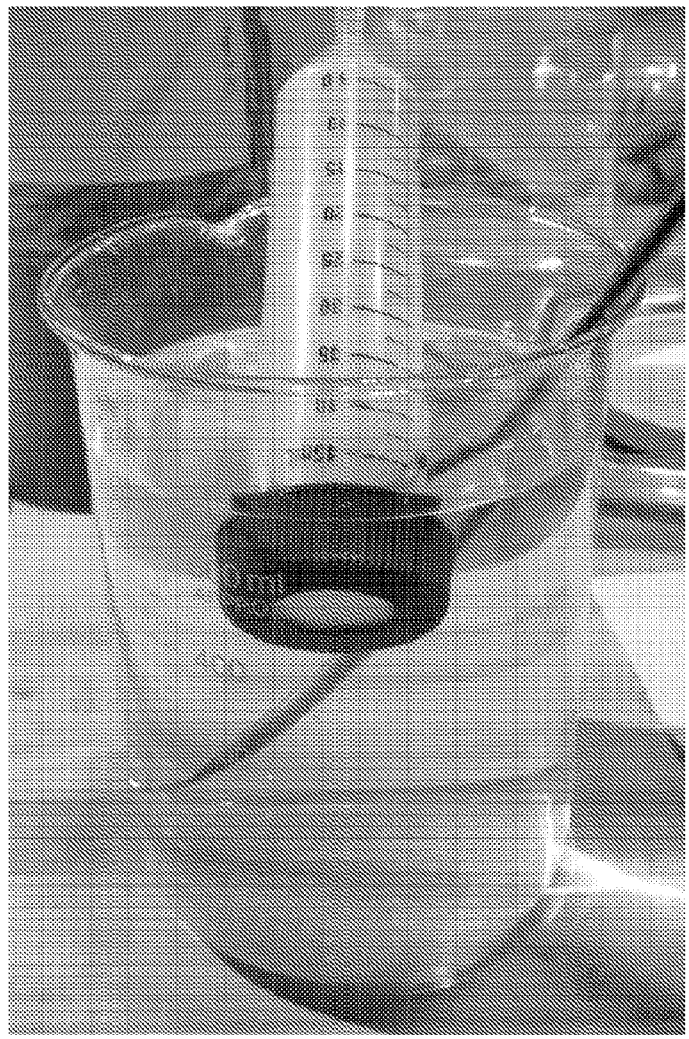
FIG. 4 is, according to one set of embodiments, a photograph of an experimental setup used to demonstrate the controlled injection of water.

This example illustrates the use of an osmotic medium (in this case, an osmotic membrane) to draw water into a housing from an external environment. FIG. 4 is a photograph of the experimental setup used to perform these experiments. A 6 M solution of NaCl in water was loaded into a 50 mL syringe. An osmotic membrane (an HTI OsMem™ TFC-ES membrane, from Hydration Technology Innovations) was placed over the opening of the syringe and secured in place using a threaded cap. The capped syringe was then placed into a 500 mL beaker containing 0.6 M solution of NaCl in water. One side of the osmotic membrane was exposed to the 0.6 M NaCl solution in the 500 mL beaker while another side of the osmotic membrane was exposed to the 6 M NaCl solution within the syringe. Water was drawn across the osmotic membrane, from the beaker into the syringe such that the concentration of NaCl within the syringe was gradually decreased. The concentration of NaCl within the syringe as a function of total water injected decreased exponentially, similar to the behavior shown in FIG. 2. In addition, the rate at which water was transported into the housing decreased with time, similar to the behavior shown in FIG. 3.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for transporting water into an electrochemical cell, comprising:
   a housing defining a housing interior and comprising an inlet and an outlet;
   an osmotic medium associated with the inlet and defining an interface between the housing interior and an environment external to the housing, such that the housing is configured to be submerged in the external environment, wherein the osmotic medium is configured to:
   separate water from a solute in the environment surrounding the housing;
   purify the water;
   transport the purified water through the osmotic medium to the housing interior; and
   restrict transport of the solute through the osmotic medium;
   a pressure-activated valve associated with the outlet and defining an interface between the housing interior and an electrochemical cell interior;
   an anode within the electrochemical cell interior; and
   a cathode within the electrochemical cell interior, wherein there is no obstruction between the anode and the cathode.

2. The apparatus of claim 1, comprising an aqueous solution contained within the housing interior.

3. The apparatus of claim 2, wherein the aqueous solution is configured to create an osmotic pressure sufficiently large to osmotically transport the purified water from the environment external to the housing to the housing interior through the osmotic medium.

4. The apparatus of claim 1, wherein the apparatus is configured to consume the water during operation as a reactant.

5. The apparatus of claim 2, wherein the aqueous solution comprises at least one solute and the solute comprises at least two of $OH^-$, $MnO_4^{2-}$, $Cl^-$, $Na^+$, $Mg^{2+}$, $SO_4^{2-}$, $Ca^{2+}$, $K^+$, $Br^-$, $Sr^{2+}$, or $F^-$.

6. The apparatus of claim 1, wherein the housing contains water and a co-solvent.

7. The apparatus of claim 1, wherein the apparatus is configured to consume the water during operation to activate an electrolyte.

8. The apparatus of claim 1, wherein a solute within the housing interior corresponds to an electrolyte compound capable of transporting ions in the electrochemical cell.

9. The apparatus of claim 1, wherein the housing is incorporated in whole or in part into a containment structure of the electrochemical cell.

10. The apparatus of claim 1, wherein a solute within the housing interior corresponds to a reactant compound capable of being electrochemically consumed in the electrochemical cell.

11. The apparatus of claim 1, wherein the osmotic medium is configured to transport the water across an osmotic membrane to equalize solute concentrations on each side of the osmotic medium.

12. The apparatus of claim 11, wherein the osmotic medium passively transports the water.

13. The apparatus of claim 1, wherein the pressure-activated valve is a relief valve or a check valve.

14. The apparatus of claim 1, wherein the electrochemical cell interior is fluidically connected to the housing interior.

15. The apparatus of claim 1, wherein the electrochemical cell consumes the purified water during operation.

16. An apparatus for transporting water into an electrochemical cell, comprising:
    an osmotic medium fluidically separating an interior compartment of an electrochemical cell from an environment external to the electrochemical cell, wherein the osmotic medium is configured to:
    separate water from a solute in the environment external to the electrochemical cell;
    purify the water;
    transport the water and purified water through the osmotic medium to the interior compartment; and
    restrict transport of the solute through the osmotic medium,
    wherein the electrochemical cell is configured to consume water as a reactant during operation.

17. A method comprising at least partially submerging the apparatus of claim 1, into a water-containing liquid.

18. The method of claim 17, wherein the water-containing liquid is a saline aqueous solution.

19. The method of claim 17, wherein, after the apparatus is submerged into the water-containing liquid, at least a portion of the water within the water-containing liquid is transported across the osmotic medium into the housing interior.

20. The method of claim 19, wherein the transport of water into the housing interior raises the pressure of the liquid within the housing interior beyond a threshold pressure, and after the threshold pressure is reached, water is transported from the housing interior, across the pressure-activated valve, and into an interior of the electrochemical cell.

* * * * *